(12) United States Patent
Brooks

(10) Patent No.: US 9,227,799 B2
(45) Date of Patent: Jan. 5, 2016

(54) VEHICLE RESTRAINTS WITH ANTI-ROTATION FEATURES

(75) Inventor: Andrew Brooks, Thiensville, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 673 days.

(21) Appl. No.: 13/599,770

(22) Filed: Aug. 30, 2012

(65) Prior Publication Data

US 2014/0064891 A1 Mar. 6, 2014

(51) Int. Cl.
*B65G 67/54* (2006.01)
*B65G 69/00* (2006.01)

(52) U.S. Cl.
CPC .................... *B65G 69/003* (2013.01)

(58) Field of Classification Search
CPC ....................................................... B65G 69/03
USPC .................................................. 414/401, 584
See application file for complete search history.

(56) References Cited

U.S. PATENT DOCUMENTS

| | | |
|---|---|---|
| 2,722,449 A | 11/1955 | Harley |
| 4,208,161 A | 6/1980 | Hipp et al. |
| 4,267,748 A | 5/1981 | Grunewald et al. |
| 4,282,621 A | 8/1981 | Anthony et al. |
| 4,373,847 A | 2/1983 | Hipp et al. |
| 4,379,354 A | 4/1983 | Hahn et al. |
| 4,472,099 A | 9/1984 | Hahn et al. |
| 4,560,315 A | 12/1985 | Hahn |
| 4,605,353 A | 8/1986 | Hahn et al. |
| 4,648,781 A | 3/1987 | Sikora |
| 4,674,941 A | 6/1987 | Hageman |
| 4,759,678 A | 7/1988 | Hageman |
| 4,843,373 A | 6/1989 | Trickle et al. |
| 4,861,217 A | 8/1989 | Erlandsson |
| 4,887,954 A | 12/1989 | Gregerson et al. |
| RE33,242 E | 6/1990 | Hipp et al. |

(Continued)

FOREIGN PATENT DOCUMENTS

| | | |
|---|---|---|
| CA | 2140743 | 6/1999 |
| CN | 1926034 | 3/2007 |

(Continued)

OTHER PUBLICATIONS

International Searching Authority, "International Search Report," issued in connection with International Application No. PCT/US2013/055808, mailed on Nov. 8, 2013, 4 pages.

(Continued)

*Primary Examiner* — Saul Rodriguez
*Assistant Examiner* — Mark Hageman
(74) *Attorney, Agent, or Firm* — Hanley, Flight & Zimmerman, LLC

(57) ABSTRACT

Example vehicle restraints having example anti-rotation features are disclosed herein. In some examples, an actuator in the form of a hydraulic cylinder moves both a vehicle barrier and its brace between stored and activated positions. If the vehicle pushes the barrier from an upper blocking position to an intermediate blocking position, the brace helps support the barrier at the intermediate blocking position to prevent the vehicle from further pushing the barrier to its stored position. To avoid damaging a cover plate or other relatively weak areas of a vehicle's RIG (rear impact guard), some example barriers disclosed herein exert a holding force that is less at the upper blocking position than at the intermediate blocking position.

26 Claims, 6 Drawing Sheets

(56) References Cited

U.S. PATENT DOCUMENTS

| | | | |
|---|---|---|---|
| 4,988,254 A * | 1/1991 | Alexander | 414/401 |
| 5,026,242 A * | 6/1991 | Alexander | 414/401 |
| 5,071,306 A | 12/1991 | Alexander | |
| 5,096,359 A | 3/1992 | Alexander | |
| 5,120,181 A | 6/1992 | Alexander | |
| 5,203,663 A | 4/1993 | Ruppe | |
| 5,297,921 A | 3/1994 | Springer et al. | |
| 5,340,181 A | 8/1994 | Matsuyama | |
| 5,348,437 A | 9/1994 | Krupke et al. | |
| 5,505,575 A | 4/1996 | Alexander | |
| 5,882,167 A | 3/1999 | Hahn et al. | |
| 6,139,242 A * | 10/2000 | Alexander | 414/401 |
| 6,162,005 A | 12/2000 | Fritz | |
| 6,431,819 B1 | 8/2002 | Hahn | |
| 7,841,823 B2 | 11/2010 | Sveum et al. | |
| 8,616,826 B2 | 12/2013 | Cotton et al. | |
| 2004/0042882 A1 | 3/2004 | Breen | |
| 2005/0169732 A1 | 8/2005 | Sveum et al. | |
| 2006/0045678 A1 | 3/2006 | Andersen | |
| 2008/0095598 A1 | 4/2008 | Cotton et al. | |
| 2010/0266375 A1 | 10/2010 | Ion | |
| 2011/0158778 A1 | 6/2011 | Harrington | |
| 2011/0243694 A1 | 10/2011 | Andersen et al. | |
| 2012/0087772 A1 | 4/2012 | Cotton et al. | |
| 2013/0017044 A1 | 1/2013 | Brooks et al. | |
| 2013/0017045 A1 | 1/2013 | Brooks et al. | |
| 2014/0064892 A1 | 3/2014 | Proffitt et al. | |
| 2015/0210487 A1 | 7/2015 | Brooks et al. | |
| 2015/0217951 A1 | 8/2015 | Lessard et al. | |

FOREIGN PATENT DOCUMENTS

| | | |
|---|---|---|
| WO | 2013009960 | 1/2013 |
| WO | 2014035727 | 3/2014 |

OTHER PUBLICATIONS

International Searching Authority, "Written Opinion of the International Searching Authority," issued in connection with International Application No. PCT/US2013/055808, mailed on Nov. 8, 2013, 7 pages.
State Intellectual Property Office of the People's Republic of China, "First Office Action," issued in connection with Chinese application serial No. 201280034260.X, issued Jan. 12, 2015, 18 pages.
International Bureau, "International Preliminary Report on Patentability," issued in connection with International Patent Application No. PCT/US2013/055808, issued on Mar. 3, 2015, 8 pages.
IP Australia, "Patent Examination Report No. 1," issued in connection with Australian Patent Application No. 2012281071, dated Mar. 23, 2015, 3 pages.
United States Patent and Trademark Office, "Notice of Allowance", issued in connection with U.S. Appl. No. 13/233,884, dated Apr. 10, 2015 (22 pages).
Canadian Intellectual Property Office, "Office Action", issued in connection with Canadian Patent Application No. 2,840,237, dated Mar. 12, 2015 (3 pages).
Rite-Hite Holding Corporation, "G3 Posi-Lok," 4 sheets drawings/text, Drawing # 1262; Drawing # 56158; dated Sep. 26, 1989.
United States Patent and Trademark Office, "Non-Final Office Action," issued in connection with U.S. Appl. No. 13/182,049, mailed on Apr. 4, 2012, 14 pages.
International Searching Authority, "International Search Report," issued in connection with International patent application No. PCT/US2012/046416, mailed on Sep. 28, 2012, 5 pages.
International Searching Authority, "Written Opinion of the International Searching Authority," issued in connection with International patent application No. PCT/US2012/046416, mailed on Sep. 28, 2012, 7 pages.
United States Patent and Trademark Office, "Final Office Action," issued in connection with U.S. Appl. No. 13/182,049, mailed on Oct. 25, 2012, 10 pages.
United States Patent and Trademark Office, "Non-Final Office Action," issued in connection with U.S. Appl. No. 13/233,884, mailed on Nov. 19, 2012, 21 pages.
United States Patent and Trademark Office, "Final Office Action," issued in connection with U.S. Appl. No. 13/233,884, mailed on Mar. 15, 2013, 13 pages.
United States Patent and Trademark Office, "Non-Final Office Action," issued in connection with U.S. Appl. No. 13/182,049, mailed on Apr. 11, 2013, 18 pages.
United States Patent and Trademark Office, "Advisory Action," issued in connection with U.S. Appl. No. 13/233,884, mailed on Jul. 19, 2013, 8 pages.
United States Patent and Trademark Office, "Notice of Allowance and Fee(s) Due," issued in connection with U.S. Appl. No. 13/182,049, mailed on Oct. 17, 2013, 18 pages.
International Bureau, "International Preliminary Report on Patentability," issued in connection with International patent application No. PCT/US2012/046416, mailed on Jan. 23, 2014, 8 pages.
United States Patent and Trademark Office, "Notice of Allowance," issued in connection with U.S. Appl. No. 13/182,049, mailed on Jun. 23, 2014, 5 pages.
United States Patent and Trademark Office, "Restriction Requirement," issued in connection with U.S. Appl. No. 13/233,884, mailed on Jun. 19, 2014, 7 pages.
United States Patent and Trademark Office, "Notice of Allowance," issued in connection with U.S. Appl. No. 13/182,049, mailed Jan. 20, 2015, 28 pages.
United States Patent and Trademark Office, "Non-Final Office Action," issued in connection with U.S. Appl. No. 13/233,884, mailed Nov. 19, 2014, 30 pages.
United States Patent and Trademark Office, "Non-Final Office Action," issued in connection with U.S. Appl. No. 13/604,315, mailed Feb. 5, 2015, 17 pages.
IP Australia, "Patent Examination Report No. 2," issued in connection with Application No. 2012281071, Sep. 9, 2015, 3 pages.
European Patent Office, "Extended European Search Report," issued in connection with European Patent Application No. 15000161.8, on Jun. 15, 2015, 11 pages.
European Patent Office, "Extended European Search Report," issued in connection with European Patent Application No. 15000162.6, on Jun. 15, 2015, 11 pages.
United States Patent and Trademark Office, "Supplemental Notice of Allowability," issued in connection U.S. Appl. No. 13/604,315, Jul. 15, 2015, 2 pages.
United States Patent and Trademark Office, "Second Supplemental Notice of Allowability," issued in connection U.S. Appl. No. 13/604,315, Aug. 18, 2015, 2 pages.
United States Patent and Trademark Office, "Third Supplemental Notice of Allowability," issued in connection U.S. Appl. No. 13/604,315, Aug. 21, 2015, 2 pages.
IP Australia, "Patent Examination Report No. 1 ," issued in connection with Australian Patent Application No. 2015200158, Aug. 26, 2015, 5 pages.
State Intellectual Property Office of the People's Republic of China, "Second Office Action," issuedin connection with Chinese application serial No. 201280034260.X, issued Aug. 5, 2015, 16 pages.
United States Patent and Trademark Office, "Non-Final Office Action", issued in connection with U.S. Appl. No. 14/174,583, dated Jul. 15, 2015 (48 pages).
United States Patent and Trademark Office, "Notice of Allowance," issued in connection with U.S. Appl. No. 13/604,315, on Jun. 30, 2015, 33 pages.
Canadian Intellectual Property Office, "Office Action", issued in connection with Canadian Patent Application No. 2,825,536, dated Mar. 31, 2015 (3 pages).
United States Patent and Trademark Office, "Notice of Allowance," issued in connection with U.S. Appl. No. 14/174,583, Oct. 5, 2015, 25 pages.
IP Australia, "Patent Examination Report No. 1," issued in connection with Application No. 2015200174, Sep. 14, 2015, 3 pages.
European Patent Office, "Communication pursuant to Rule 69 EPC," issued in connection with European Patent Application No. 15000162.6, Aug. 17, 2015, 2 pages.
European Patent Office, "Communication pursuant to Rule 69 EPC," issued in connection with European Patent Application No. 15000161.8, Aug. 10, 2015, 2 pages.

* cited by examiner

VEHICLE RESTRAINTS WITH ANTI-ROTATION FEATURES

FIELD OF THE DISCLOSURE

This patent generally pertains to vehicle restraints and, more specifically, to vehicle restraints with anti-rotation features.

BACKGROUND

When loading or unloading a truck parked at a loading dock, it is generally a safe practice to help restrain the truck from accidentally moving too far away from the dock. Some known restraints include a hook-style vehicle restraint that engages what is often referred to in the industry as a truck's ICC bar (Interstate Commerce Commission bar) or RIG (Rear Impact Guard). An ICC bar or RIG comprises a bar or beam that extends horizontally across the rear of a truck, below the truck bed. Its primary purpose is to help prevent an automobile from under-riding the truck in a rear-end collision.

A RIG, however, also provides a convenient structure for a hook-style restraint to reach up in front of the bar to obstruct the bar's movement away from the dock. To release the truck and prepare for the next truck to enter the dock, many restraints descend below the bar to a preparatory position. Although the horizontal bar of a RIG is fairly standardized, the bar's supporting structure can vary significantly. In some cases, the supporting structure can interfere with the operation of the restraint.

DETAILED DESCRIPTION

Figure 1:
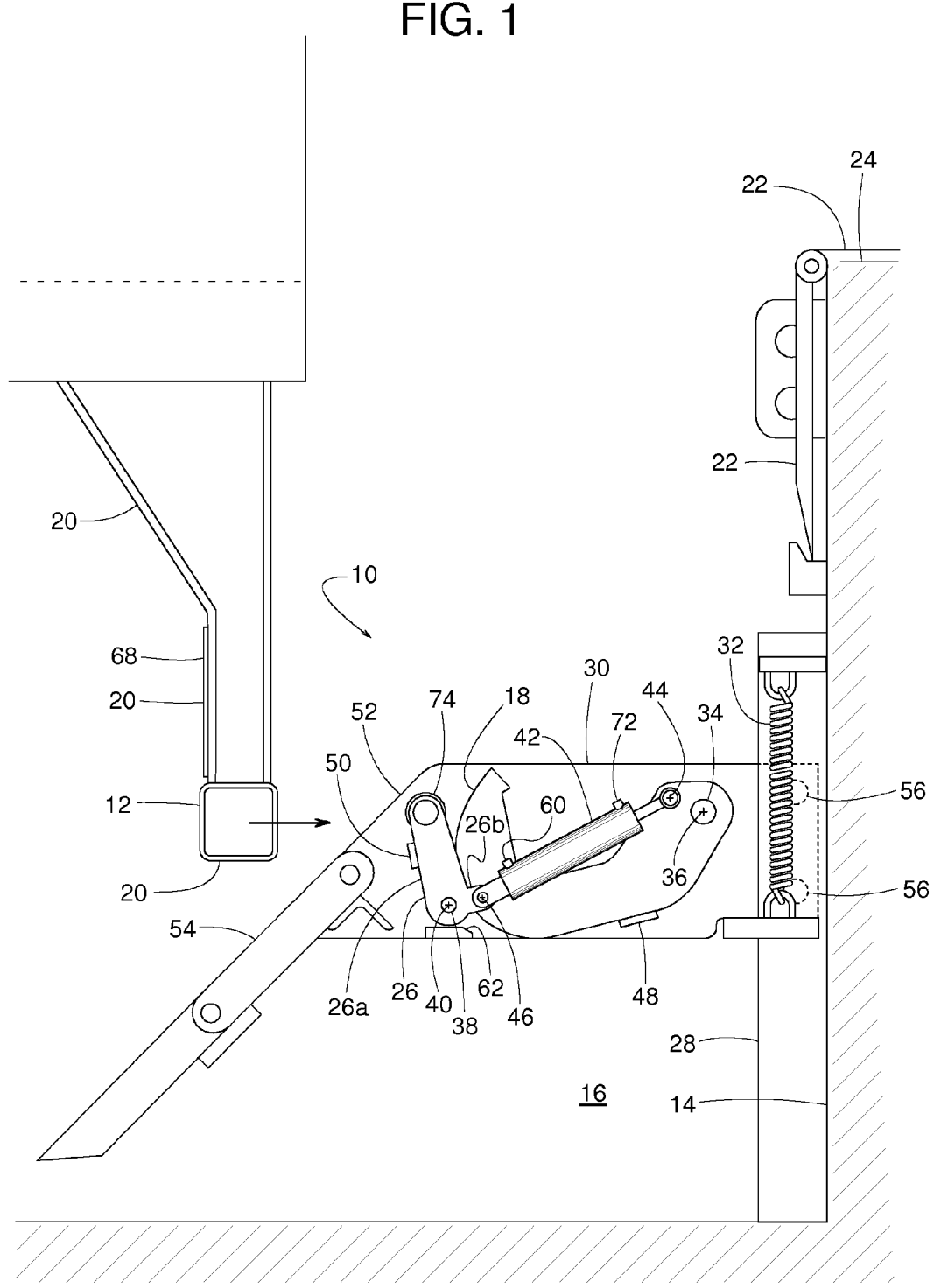
FIG. 1 is a side view of an example vehicle restraint constructed in accordance with the teachings disclosed herein, wherein an example vehicle is shown approaching the example vehicle restraint.

FIGS. 1-6 show an example vehicle restraint 10 that helps prevent a vehicle 12 (e.g., truck, trailer, etc.) from accidentally moving too far forward away from a dock face 14 of a loading dock 16 while cargo is being added or removed from the vehicle. To limit such forward movement, restraint 10 includes a barrier 18 moveable to a range of blocking positions for capturing or restraining the vehicle's RIG 20 (Rear Impact Guard), also known as an ICC bar (Interstate Commerce Commission bar). The term, "RIG" encompasses the horizontal impact bar and/or the framework or structure that connects the bar to the vehicle.

Figure 3:
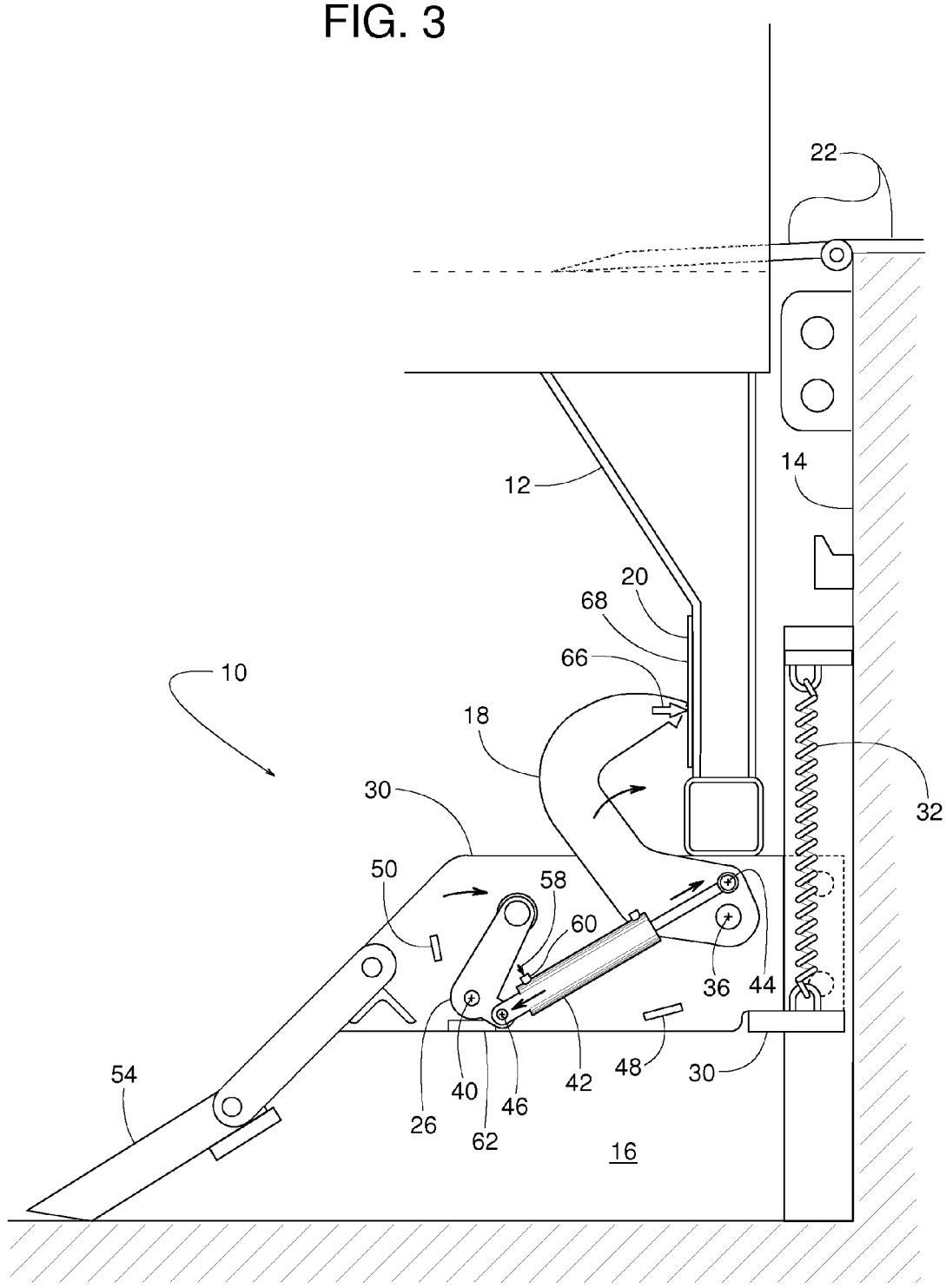
FIG. 3 is a side view similar to FIG. 1, but showing an example barrier of the vehicle restraint of FIGS. 1 and 2 in an example blocking position.
Figure 4:
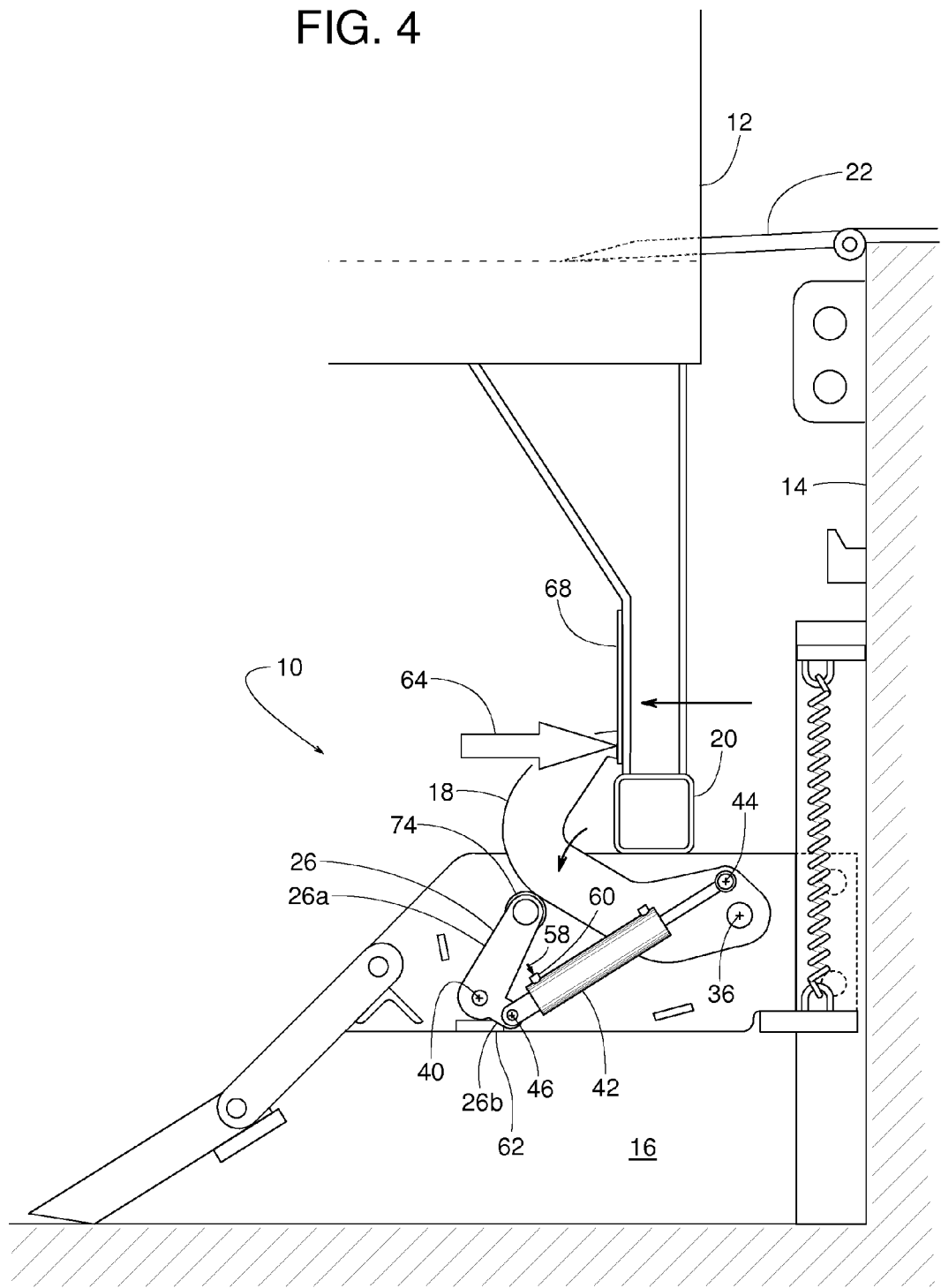
FIG. 4 is a side view similar to FIG. 3, but showing the example vehicle having pushed the example barrier of FIGS. 1-3 to an example intermediate blocking position.

In the illustrated example, the range of blocking positions of barrier 18 includes an upper blocking position (FIG. 3) and an intermediate blocking position (FIG. 4). Barrier 18 is also movable to a stored position (FIGS. 1, 2 and 6) to release vehicle 12. In the illustrated example, the intermediate blocking position is between the blocking position and the stored position. With barrier 18 in a blocking position, securing vehicle 12, a dock leveler 22 can be deployed to provide a bridge across which forklifts and other material handling equipment can travel to transfer cargo between vehicle 12 and an elevated platform 24 of dock 16.

To ensure that barrier 18 can positively restrain RIG 20, some examples of vehicle restraint 10 include a brace 26 movable between a supporting position (FIGS. 3 and 4) to support or engage barrier 18 and a release position (FIGS. 1, 2 and 6) to release or disengage barrier 18. With brace 26 in the supporting position, as shown in FIGS. 3 and 4, brace 26 restricts or limits the downward movement of barrier 18 in a direction away from the dock face 14. If vehicle 12 attempts separating or moving away from elevated platform 24 prematurely (e.g., in a direction away from dock face 14), RIG 20 urges barrier 18 to move or rotate toward the stored position. Barrier 18 may be configured to be yieldable in the rotational direction in order to protect the actuator 42 and its related components from, for example, damage. However, brace 26 holds or engages barrier 18 at a position or height sufficient to enable barrier 18 to restrain or engage RIG 20 as shown in FIG. 4.

The vehicle restraint 10 of the illustrated example includes a track 28 attached to dock face 14. The vehicle restraint 10 also includes a main body 30 mounted to travel (e.g., substantially vertically) along track 28 and one or more springs 32 to urge main body 30 toward the dock leveler 22 or the RIG 20 (e.g., an upward direction in the orientation of FIG. 1). A shaft 34 connects or couples barrier 18 to main body 30 such that barrier 18 can rotate about a first axis 36 relative to main body 30 and a shaft 38 connects or couples brace 26 to main body 30 such that brace 26 can rotate about a second axis 40 relative to main body 30. An actuator 42 moves or positions barrier 18 between the stored position and the blocking position and moves brace 26 between the supporting position and the release position. In the illustrated example, actuator 42 is shown as a single cylinder (i.e., one piston/cylinder apparatus) coupled to barrier 18 at a first connection point 44 and coupled to brace 26 at a second connection point 46. Other examples of actuator 42 include, but are not limited to, multiple cylinders, a solenoid, a linear motor, an electric motor, a hydraulic motor, a spring, and/or various combinations thereof.

One operation example of vehicle restraint 10 follows the sequence of FIGS. 1-6. FIG. 1 shows vehicle 12 backing into dock 16 and approaching vehicle restraint 10. At this point in the operation, spring 32 holds main body 30 at an elevated preparatory elevation or position to receive or be engaged by RIG 20. To allow vehicle 12 to move RIG 20 over the top of barrier 18, actuator 42 retracts to rotate brace 26 to its release position and to rotate barrier 18 to its stored position. In some examples, brace 26 rotates or travels between the release position and the supporting position at least partially simultaneously with barrier 18 as barrier 18 rotates or travels between the stored position and the blocking position. The barrier's center of gravity relative to first axis 36 assists in rotating barrier 18 to its stored position. FIG. 1 shows barrier 18 resting upon a stop 48 that prevents barrier 18 from rotating below its stored position. Another stop 50 prevents brace 26 from rotating past its release position.

Figure 2:
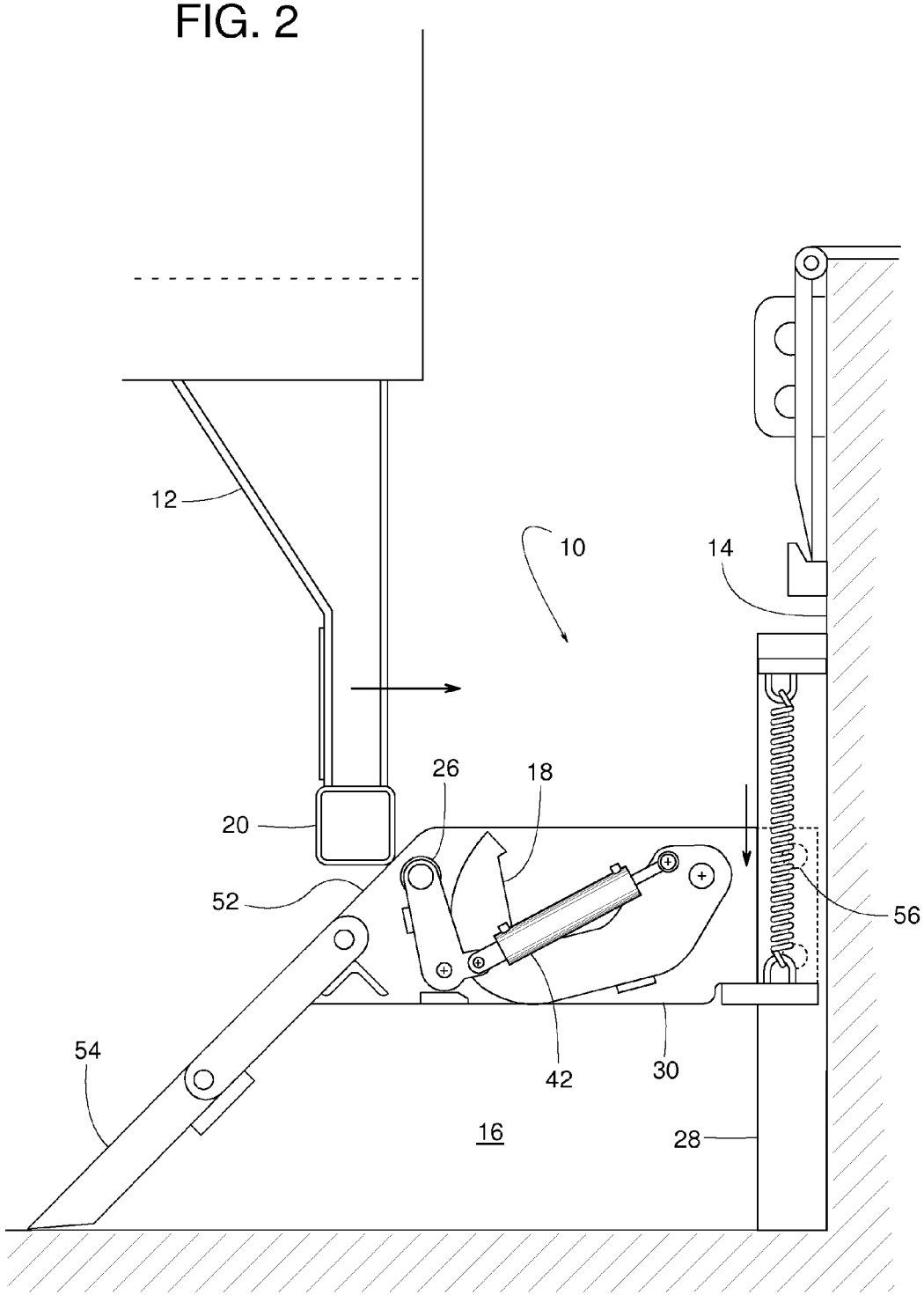
FIG. 2 is a side view similar to FIG. 1, but showing the example vehicle restraint being engaged by the example vehicle.

Next, FIG. 2 shows vehicle 12 continuing to move back toward dock face 14. Upon doing so, RIG 20 forces the vehicle restraint's main body 30 downward by RIG 20 sliding along a ramp portion 52 of main body 30. In cases where RIG 20 is exceptionally low, an articulated lead-in ramp extension 54 is used in some examples to guide RIG 20 onto ramp 52. In this example, a set of rollers 56 on main body 30 and extending into track 28 reduces (e.g., minimizes) friction as main body 30 travels vertically along track 28. As RIG 20 pushes main body 30 down, as shown in FIG. 2, barrier 18 remains in its stored position, and brace 26 is in its release position.

Referring to FIG. 3, after RIG 20 pushes main body 30 down to a lowered operative elevation or position (FIGS. 3-6) and after the vehicle 12 moves the RIG 20 sufficiently close to dock face 14, actuator 42 is energized and/or moves from a restored state (FIGS. 1, 2, 5 and 6) to an activated state (FIGS. 3 and 4). The activated state is defined as the condition in which actuator 42 urges barrier 18 toward its upper blocking position or at least attempts to hold barrier 18 at a blocking position. The restored state is defined as the condition in which actuator 42 urges or at least allows barrier 18 to return to its stored position.

In some examples of the activated state, hydraulic pressure 58 at a cylinder-end port 60 of actuator 42 extends actuator 42 to rotate barrier 18 about first axis 36 toward the barrier's upper blocking position and rotate brace 26 (e.g., simultaneously) about second axis 40 to the brace's supporting position. Specifically, the extension of actuator 42 rotates first connection point 44 about first axis 36 from a first position shown in FIG. 2 to a second position shown in FIG. 3. The extension of actuator 42 also rotates (e.g., simultaneously) second connection point 46 about second axis 40 from a first location shown in FIG. 2 to a second location shown in FIG. 3. As viewed from the perspective of FIGS. 2 and 3, barrier 18 and brace 26 rotate in the same direction (e.g., a clockwise direction in the orientation of FIG. 3) as actuator 42 extends between the restored state and the activated state. A stop 62 prevents brace 26 from rotating past its supporting position shown in FIG. 3. With brace 26 in its supporting position and barrier 18 in its upper blocking position, vehicle restraint 10 restrains vehicle 12 at dock 16, so dock leveler 22 can be deployed as shown in FIG. 3.

If, while still being restrained, vehicle 12 moves forward away from dock face 14, RIG 20 might exert sufficient force to push barrier 18 away from the blocking position and toward the stored position (e.g., in a downward or counterclockwise direction about axis 36). However, rotation of the barrier 18 away from the dock face 14 is limited to the intermediate blocking position because barrier 18 encounters or engages brace 26, which provides a solid mechanical engagement that restricts or limits further rotational movement of barrier 18 (e.g., in a downward or counterclockwise direction) as shown in FIG. 4. In some examples, barrier 18 supported by brace 26 provides a much greater resistive force 64 to the forward push of vehicle 12 than the force barrier 18 could otherwise exert under the urging of actuator 42 alone (without excessive pressure building within the hydraulic cylinder or excessive force being applied to first connection point 44).

In examples where barrier 18 exerts less holding force 66 (FIG. 3) in the upper blocking position than in the intermediate blocking position, the reduced holding force can be particularly beneficial when the supporting structure of RIG 20 includes a relatively lightweight plate 68. When barrier 18 is at the upper blocking position, as shown in FIG. 3, a tip of barrier 18 might engage a relatively weak portion of plate 68. Barrier 18 exerting significant pressure or force (e.g., a maximum force) at this point or position may cause damage to plate 68. Thus, it might be beneficial to limit the barrier's holding force at the barrier's upper blocking position. However, if the barrier's holding force is too light throughout its full range of blocking positions, vehicle 12 might forcibly release itself completely from vehicle restraint 10. To prevent forcible release of the vehicle, brace 26 enables barrier 18 to exert substantial resistive force 64 at the barrier's intermediate blocking position, as shown in FIG. 4. Moreover, barrier 18 at the intermediate blocking position, in some cases, engages lower areas of plate 68 and/or other areas of RIG 20 where RIG 20 can withstand relatively greater amounts of force.

Figure 5:
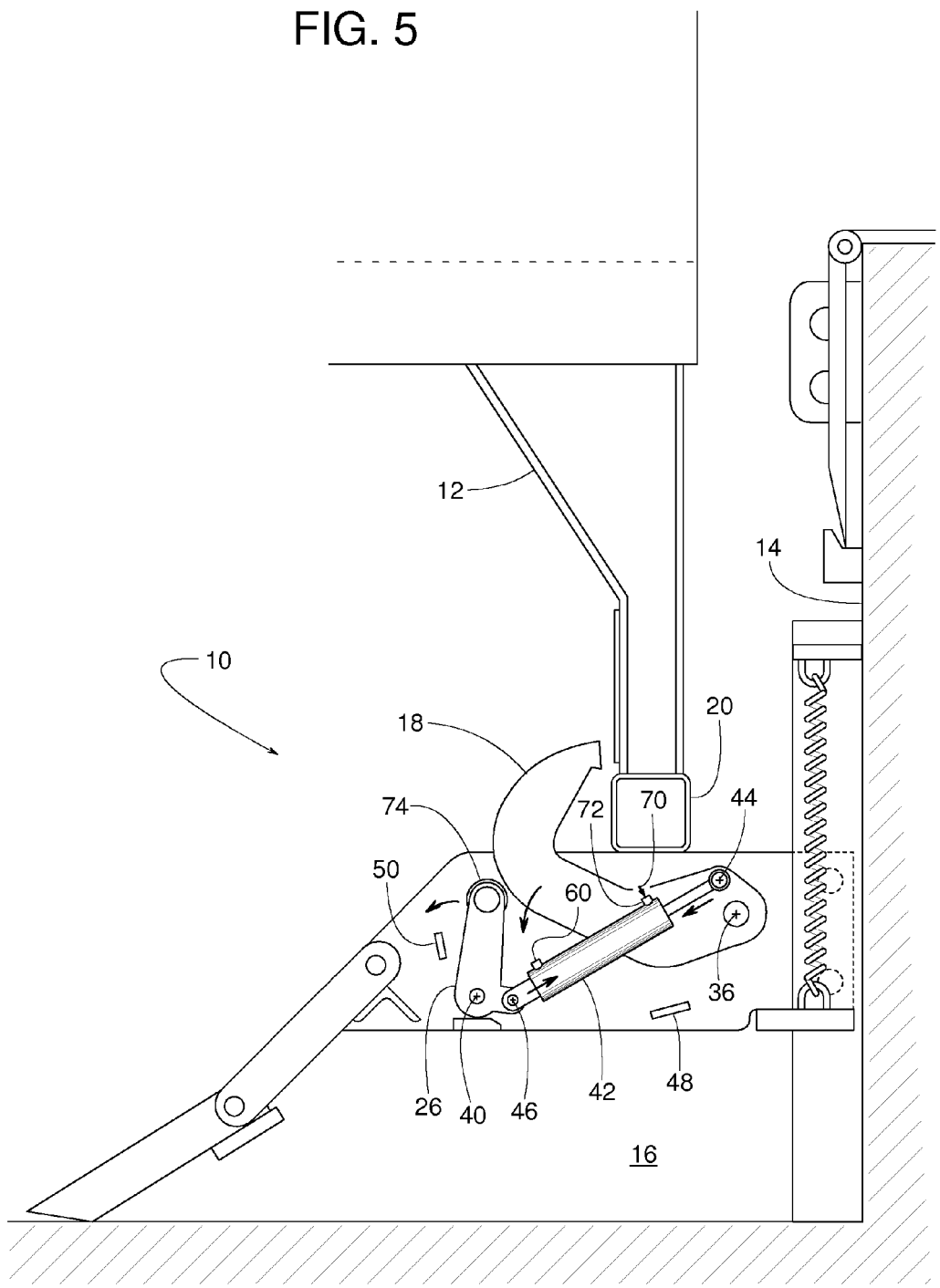
FIG. 5 is a side view similar to FIG. 4, but showing the example vehicle restraint moving to an example release position.

Referring to FIG. 5, to release vehicle 12 from the condition shown in FIGS. 3 and 4, actuator 42 is switched to the restored state. To retract or switch actuator 42 to the restored state, hydraulic pressure is released at cylinder-end port 60. In some cases, hydraulic pressure 70 is provided at a rod-end port 72 of actuator 42. When actuator 42 retracts, brace 26 rotates about axis 40 to the release position and barrier 18 rotates about axis 36 to the stored position. FIG. 5 shows actuator 42 rotating barrier 18 and brace 26 in the same direction (e.g., in a counterclockwise direction). Additionally, actuator 42 may rotate barrier 18 and brace 26 simultaneously.

Figure 6:
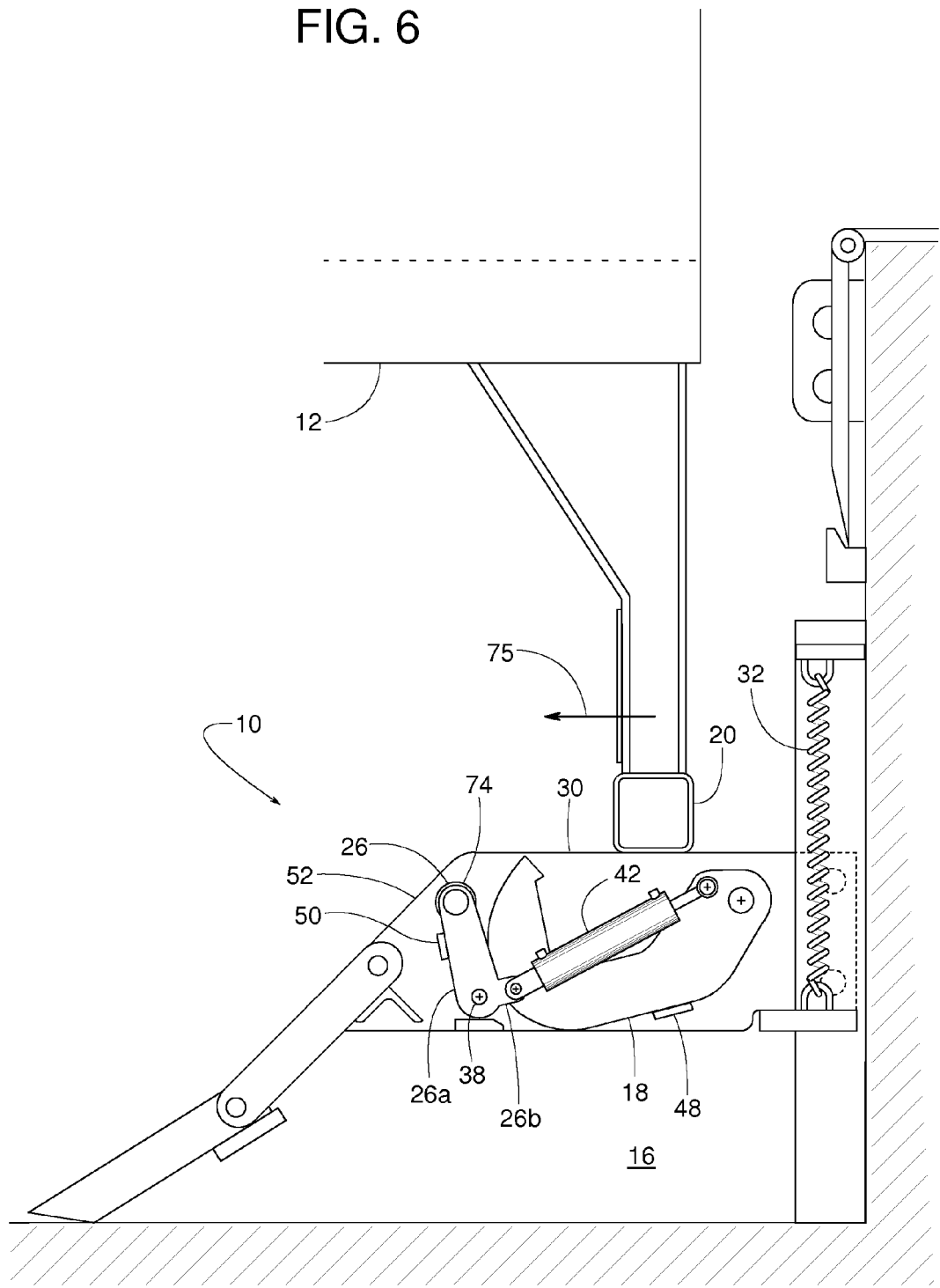
FIG. 6 is a side view similar to FIGS. 1-5, but showing the example vehicle restraint in the release position.

The rotation continues until brace 26 reaches its release position at stop 50 and barrier 18 reaches its stored position at stop 48 as shown in FIG. 6. With barrier 18 in its stored position as shown in FIG. 6, vehicle 12 is free to depart dock 16 without interference from the barrier 18. As vehicle 12 travels in a forward direction 75, RIG 20 moves or slides along the upper edge and ramp portion 52 of main body 30. As RIG 20 slides along ramp portion 52, spring 32 forces main body 30 back to its elevated preparatory position of FIG. 1 so that restraint 10 is ready for the next vehicle that approaches loading dock 16.

In some cases, as brace 26 and barrier 18 rotate, the upper end of brace 26 might travel across the lower edge of barrier 18. To reduce friction in this area, in some examples, brace 26 includes a roller 74 for engaging barrier 18.

In the illustrated example, brace 26 has a main arm 26a with an integral lever arm 26b. However, in some examples, arms 26a and 26b are separate structures that are keyed to shaft 38 such that arms 26a and 26b rotate as a unitary unit.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A vehicle restraint to engage a RIG (rear impact guard) of a vehicle at a loading dock, the vehicle restraint comprising:
a main body mountable at the loading dock;
a barrier coupled to the main body and movable relative thereto, the barrier being movable between an upper blocking position to block the RIG, a stored position to release the RIG, and an intermediate blocking position that is higher than the stored position and lower than the upper blocking position;
a brace coupled to the main body, the brace to move relative to the main body and the barrier between a supporting position and a release position, the supporting position corresponding to the intermediate position of the barrier, the brace to engage the barrier when the barrier is in the intermediate position to prevent the barrier from rotating toward the stored position, and the brace to disengage the barrier when the barrier is between the intermediate position and the upper blocking position; and an actuator directly coupled to the barrier at a first connection point and directly coupled to the brace at a second connection point, the first connection point being spaced apart from the second connection point, movement of the barrier being at least sometimes powered by the actuator, and movement of the brace being at least sometimes powered by the actuator.

2. The vehicle restraint of claim 1, further comprising:
a first axis spaced apart from the first connection point, the barrier and the first connection point being rotatable about the first axis; and
a second axis spaced apart from the second connection point, the brace and the second connection point being rotatable about the second axis.

3. The vehicle restraint of claim 1, wherein the first connection point is selectively movable between a first position and a second position relative to the main body, the first position and the second position being associated, respectively, with the barrier at the stored position and the upper blocking position, the second connection point being selectively movable between a first location and a second location relative to the main body, the first location and the second location being associated, respectively, with the brace at the release position and the supporting position.

4. The vehicle restraint of claim 3, wherein the first position and the second position are spaced apart both vertically and horizontally, and the first location and the second location are spaced apart both vertically and horizontally.

5. The vehicle restraint of claim 1, wherein the main body is vertically movable between an elevated preparatory elevation and a lowered operative elevation.

6. The vehicle restraint of claim 5, further comprising a spring to urge the main body to the elevated preparatory elevation.

7. The vehicle restraint of claim 1, wherein the brace includes a roller to selectively engage and disengage the barrier.

8. The vehicle restraint of claim 1, wherein the actuator is a cylinder coupled to the barrier and the brace.

9. The vehicle restraint of claim 1, wherein the barrier and the brace rotate in a same direction as the barrier and the brace move, respectively, toward the stored position and the release position.

10. A vehicle restraint for engaging a RIG (rear impact guard) of a vehicle at a loading dock, the vehicle restraint comprising:
a main body mountable at the loading dock, the main body being movable over a range of elevations including an elevated preparatory elevation and a lowered operative elevation;
an actuator carried by the main body, the actuator being selectively movable between an activated state and a restored state;
a barrier coupled to the main body, the barrier being directly coupled to the actuator, the barrier being movable relative to the main body to selectively block and release the RIG of the vehicle, the barrier being movable between an upper blocking position, an intermediate blocking position, and a stored position, at a given elevation of the main body the barrier being higher in the upper blocking position than in the intermediate blocking position, at another given elevation of the main body the barrier being higher in the intermediate blocking position than in the stored position, movement of the barrier being powered at least sometimes by the actuator; and a brace coupled to the main body, the brace being movable relative to the main body and the barrier, the brace being movable between a supporting position and a release position, movement of the brace being powered at least sometimes by the actuator, the brace to inhibit movement of the barrier from the intermediate blocking position to the stored position when the barrier is at the intermediate blocking position while the brace is in the supporting position and the actuator is in the activated state, the barrier to disengage the brace when the brace is in the supporting position and the barrier moves between the intermediate blocking position and the upper blocking position and the actuator is in the activated state, the barrier to move from the intermediate blocking position toward the stored position when the brace is in the release position and the actuator is in the restored state.

11. The vehicle restraint of claim 10, wherein the actuator is a cylinder coupled to the barrier and the brace.

12. The vehicle restraint of claim 10, wherein actuator is coupled to the barrier at a first connection point and is coupled to the brace at a second connection point, the first connection point being spaced apart from the second connection point.

13. The vehicle restraint of claim 12, further comprising:
a first axis spaced apart from the first connection point, the barrier and the first connection point being rotatable about the first axis; and
a second axis spaced apart from the second connection point, the brace and the second connection point being rotatable about the second axis.

14. The vehicle restraint of claim 12, wherein the first connection point is selectively movable between a first position and a second position relative to the main body, the first position and the second position being associated, respectively, with the barrier at the stored position and the upper blocking position, the second connection point being selectively movable between a first location and a second location relative to the main body, the first location and the second location being associated, respectively, with the brace at the release position and the supporting position.

15. The vehicle restraint of claim 14, wherein the first position and the second position are spaced apart both vertically and horizontally, and the first location and the second location are spaced apart both vertically and horizontally.

16. The vehicle restraint of claim 10, wherein the barrier and the brace rotate in a same direction upon the barrier and the brace moving toward the stored position and the release position, respectively.

17. The vehicle restraint of claim 10, further comprising a spring urging the main body toward the elevated preparatory elevation.

18. The vehicle restraint of claim 10, wherein the brace includes a roller that engages the barrier when the barrier is at the intermediate blocking position while the brace is in the supporting position.

19. A method for restraining a vehicle, the method comprising:
moving a barrier from a stored position to an upper blocking position via an actuator, the barrier to engage the vehicle in the blocking position; and
moving a brace from a release position to a supporting position via the actuator, the barrier to engage the brace as a result of the vehicle moving the barrier from the upper blocking position to an intermediate blocking position while the brace is in the supporting position, the barrier to disengage the brace when the barrier is positioned between the intermediate blocking position and the upper blocking position.

20. The method of claim 19, further comprising:
moving the brace from the supporting position to the release position via the actuator; and
moving the barrier from the intermediate blocking position to the stored position via the actuator, the brace and the barrier at least sometimes moving simultaneously as the brace and the barrier move, respectively, toward the release position and the stored position.

21. The method of claim 19, wherein moving the barrier and the brace comprises rotating the barrier and the brace in a same direction when moving, respectively, the barrier and the brace toward the stored position and the release position.

22. The method of claim 19, further comprising the brace disengaging the barrier.

23. The method of claim 19, wherein the barrier engages a roller of the brace when the barrier is in the intermediate blocking position while the brace is in the supporting position.

24. The method of claim 23, further comprising the roller disengaging the barrier when the barrier is in the blocking position and the brace is in the supporting position.

25. The method of claim 19, further comprising:
connecting the actuator to the barrier at a first connection point formed directly on the barrier;
connecting the actuator to the brace at a second connection point formed directly on the brace;
moving the first connection point both vertically and horizontally upon moving the barrier from the stored position to the upper blocking position; and
moving the second connection point both vertically and horizontally upon moving the brace from the release position to the supporting position.

26. The method of claim 19, further comprising:
connecting directly the actuator to the barrier at a first connection point;
connecting directly the actuator to the brace at a second connection point;
rotating the barrier about a first axis as the barrier moves from the stored position to the upper blocking position;
rotating the brace about a second axis as the brace moves from the release position to the supporting position;
rotating the first connection point about the first axis; and
rotating the second connection point about the second axis.

* * * * *